Aug. 11, 1936.  A. M. CANDY  2,050,271
WELDING ELECTRODE
Filed Nov. 25, 1933
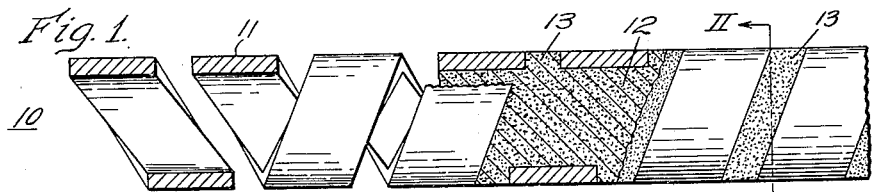
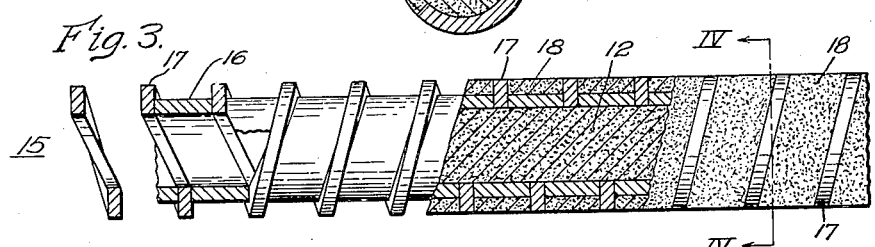
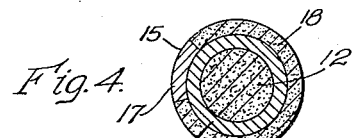
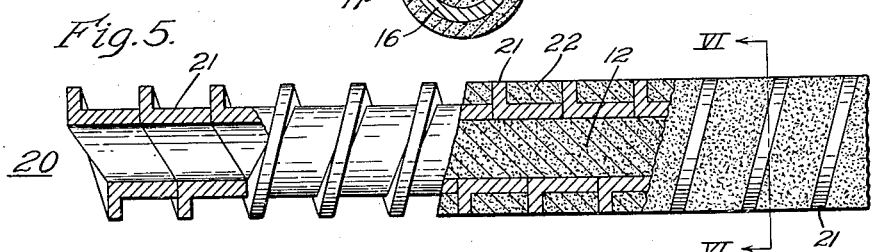
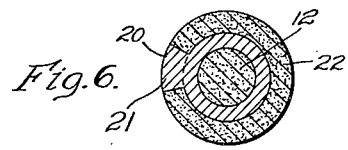
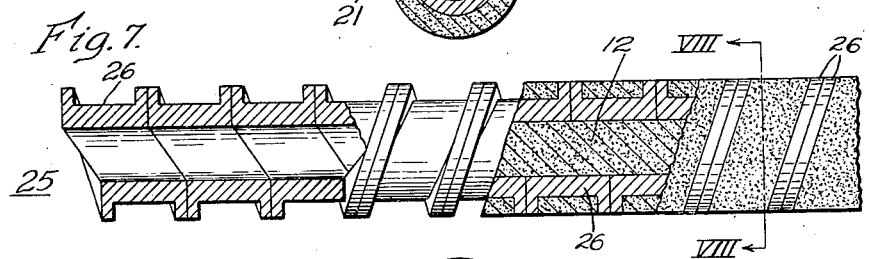
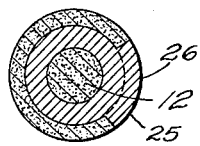
WITNESSES:
INVENTOR
Albert M. Candy.
ATTORNEY Patented Aug. 11, 1936

2,050,271

UNITED STATES PATENT OFFICE 2,050,271

WELDING ELECTRODE

Albert M. Candy, Wilkinsburg, Pa., assignor to Westinghouse Electric & Manufacturing Company, East Pittsburgh, Pa., a corporation of Pennsylvania Application November 25, 1933, Serial No. 699,784

13 Claims. (Cl. 219—8)

My invention relates, generally, to arc welding and it has particular relation to electrodes for use in performing arc welding operations.

In order to feed by means of automatic equipment heavily fluxed electrodes, various means have been proposed, none of which have been entirely satisfactory. All of the electrodes that have been proposed, as far as I am aware, have utilized a metallic rod for the core and a heavy flux coating has been provided around the core. Since the flux coating, as generally compounded, comprises insulating material which prevents the conduction of the welding current therethrough, it is necessary to provide some means for conducting the welding current to the core which is located underneath the flux.

One electrode that has been proposed for this purpose comprises a heavily fluxed electrode having a metallic core and having a portion of the flux removed longitudinally in order to provide for applying a brush or other sliding contact means through the open portion of the flux into engagement with the core. This particular type of electrode has the disadvantage that the flux is unsymmetrically placed with respect to the core when the longitudinal opening is made, and further, that it is expensive to manufacture and use.

Another type of welding electrode has been proposed in which the metallic core member is provided with a spirally wrapped metallic wire, the spirals being spaced a considerable distance apart and a fluxing compound being extruded onto the core. The thickness of the flux is slightly less than the diameter of the spirally wrapped wire so that the outer surface thereof is bare, thereby permitting the conduction of the current to the spiral wire and therefrom to the metallic core. This type of electrode has the disadvantage that it is relatively inflexible and, in the large sizes, it cannot be readily wound upon reels, from which it is desirable to feed a wire for automatic use.

A still further modification which has been proposed is to feed the current into the heavily fluxed electrode at one end of the electrode. For this modification, it is necessary to use relatively long lengths of electrode in order to provide for automatic operation over an appreciable length of time. When the current is conducted entirely through the electrode from one end, it will be readily apparent that there is a considerable power loss in the electrode. In certain instances, the electrode may become so greatly heated, due to the power loss therein, as to seriously impair the desirable welding characteristics of the heavily fluxed electrode.

The desirable features of a heavily fluxed electrode for use in automatic welding comprise an electrode to which the welding current may be readily conducted at a point close to the arc, an electrode which, while heavily fluxed, possesses a high degree of flexibility so that it may be wound on a reel, and an electrode which has large enough flux carrying capacity to permit the use of the necessary amount of flux so that the desired welding characteristics may be obtained.

I have obtained these desirable features in a heavily fluxed electrode by placing the metal, which usually forms the core and which is usually disposed in the center, in the form of a metallic spiral, the metallic portion of the electrode being on the outside and the fluxing compound being disposed within the spirals and between them. Due to the fact that the metallic portion of the electrode is on the outside, it is possible to readily conduct current thereto at any point along its surface. Because of the spiral form of the metallic member, the welding electrode possesses a high degree of flexibility. It is possible to provide any desired amount of flux by increasing the radius of the metallic member to any desired extent or by other types of construction which will be set forth hereinafter.

In view of the foregoing, the object of my invention, generally stated, is to provide a welding electrode which shall be simple and efficient in operation and which may be readily and economically manufactured and used.

The principal object of my invention is to provide a heavily fluxed electrode which may be fed by means of automatic arc welding apparatus to maintain a welding arc.

Another object of my invention is to provide for conducting current continuously to a heavily fluxed electrode near the arcing end.

Still another object of my invention is to provide a high degree of flexibility in a heavily fluxed automatic arc welding electrode.

Other objects of my invention will, in part, be obvious and, in part, appear hereinafter.

My invention accordingly is disclosed in the embodiment hereof shown in the accompanying drawing and comprises the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description, taken in connection with the accompanying drawing, in which:

Figure 1 is a view, partly in side elevation and partly in section, illustrating one embodiment of my invention;

Fig. 2 is a sectional view taken along the line II—II of Fig. 1;

Figs. 3, 5 and 7 are views similar to Fig. 1 showing different embodiments of my invention; and Figs. 4, 6 and 8 are sectional views taken along the lines IV—IV, VI—VI and VIII—VIII of Figs. 3, 5 and 7, respectively.

Referring now particularly to Fig. 1 of the drawing, it will be observed that the metallic portion of the electrode, shown generally at 10, comprises a flat wound spiral member 11 which is wound in open spirals at any suitable radius and pitch to provide a sufficient space for a fluxing compound 12. The pitch between adjacent spirals may be as great as desired, depending upon the amount of flux 12 which it is desired to provide for the electrode 10.

It will be understood that the spiral member 11 may comprise any suitable metals which have been found desirable for use in arc welding. Thus, the spiral member 11 may be composed of either low or high carbon steel or any alloys which are well-known in the art.

It will also be apparent that the welding flux 12 may comprise any of the well-known ingredients, which are available for providing the desirable gaseous envelope around the arc which is maintained between the spiral member 11 and the work on which the welding operation is to be performed.

As illustrated in the drawing, the flux 12 is disposed within the spiral member 11 and between the adjacent spirals as at 13. The flux 12 may be applied by means of various extruding processes or by any other suitable means, care being taken, however, to prevent, the application of any of the flux 12 to the outer surface of the spiral member 11. This positioning of the flux 12 is desirable in order to provide for the conduction of the welding current to the outer surface of the spiral member 11 without necessitating the removal of any insulating material from the surface.

Referring now particularly to Figs. 3 and 4 of the drawing, it will be observed that a welding electrode, shown generally at 15, is provided, which comprises a flat-wound spiral member 16 and an edge-wound spiral member 17. As shown, the spiral members 16 and 17 are formed together so that the inner surfaces thereof are substantially continuous while the edge-wound member 17 extends outwardly beyond the outer surface of the flat-wound member 16.

The particular arrangement of the spiral members 16 and 17 provides an additional space for the fluxing compound 12 in that it may be positioned between adjacent turns of the edge-wound spiral 17, as at 18. Since the outer surface of the edge-wound spiral 17 remains bare, it is possible to conduct current thereto from any suitable contact members at any point along the surface of the electrode 15.

Another embodiment of the invention is illustrated in Fig. 5 of the drawing, in which a welding electrode, shown generally at 20, comprises a spiral member 21, the cross-section of which is in the form of an L. As illustrated, the L-shaped spiral member 21 is wound having the long side of the L flat wound and the short-side edge-wound, the short side extending outwardly. It will be observed that the L-shaped spiral member 21 is essentially the equivalent of the spiral members 16 and 17 shown in Fig. 3 of the drawing, they being formed into an integral member, as illustrated in Fig. 5.

The fluxing compound 12 may be disposed within the L-shaped spiral member 21 and it may also be disposed between the adjacent short sides of the spiral member, as at 22.

A still further embodiment of the invention is illustrated in Fig. 7 of the drawing, in which a welding electrode, shown generally at 25, is provided having a channel-shaped member 26 which may be wound in the form of a close spiral. The flange portions of the channel member 26 are turned outwardly and, since they are wound in the form of a close spiral, the thickness thereof may be substantially one-half that of the short side of the L-shaped spiral member 21, shown in Fig. 5. In the event that it is desirable to wind the channel member 26 in the form of an open spiral the thickness of the flange members may, of course, be increased as may be desired. As shown in the drawing, the flux 12 may be disposed within the turns and between the flanges of the spiral member 26 by any suitable means.

Since certain further changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. An electrode for use in automatic arc welding comprising, in combination, a continuous metallic spiral member of indefinite length so formed as to itself provide a troughlike spiral groove, and fluxing ingredients disposed within said spiral groove but not covering the outer surface of said spiral member, thereby permitting the conduction of welding current thereto.

2. An arc welding electrode comprising, in combination, a flat-wound metallic spiral member, an edge-wound metallic spiral member formed with said flat-wound spiral member, and a fluxing compound disposed within said spiral members and covering said flat-wound spiral member.

3. An arc welding electrode comprising, in combination, a flat-wound metallic member formed in an open spiral, an edge-wound metallic spiral member formed between the spirals of said flat-wound member and extending above the surface thereof, and a fluxing compound disposed within said spiral members and between the spirals of said edge-wound member but not covering them.

4. An arc welding electrode comprising, in combination, a flat-wound metallic spiral member of indefinite length, an edge-wound metallic spiral member disposed between the spirals of said flat wound member, the inner surfaces of said spiral members being substantially continuous and the edge-wound member extending above the surface of said flat wound member, and a fluxing compound disposed within said spiral members and between the spirals of said edge-wound member but not covering the outer surface thereof, thereby permitting the conduction of welding current thereto.

5. An arc welding electrode comprising, in combination, an L-shaped metallic member wound in the form of a spiral, and a fluxing compound disposed within said metallic member and in an exterior groove formed thereby.

6. An arc welding electrode comprising, in combination, an L-shaped metallic member wound in the form of a spiral of indefinite length, the long side of said L-shaped member being flat wound and the short side extending outwardly, and a fluxing compound disposed within said spiral member and between the short sides of said L-shaped member.

7. An arc welding electrode comprising, in combination, a channel-shaped metallic member wound in the form of a spiral, and a fluxing compound disposed within said metallic member and in an exterior groove formed thereby.

8. An arc welding electrode comprising, in combination, a channel-shaped metallic member wound in the form of a close spiral of indefinite length, and a fluxing compound disposed within said metallic member and in said channel but not covering the outer edges thereof, thereby permitting the conduction of welding current to said channel member.

9. An arc welding electrode comprising spirally wound metallic means so formed as to provide a spiral groove in the periphery of the electrode and a hollow center, and a fluxing compound disposed in said groove and hollow center.

10. An arc welding electrode comprising a spirally wound metallic member so formed as to provide a spiral groove in the periphery of the electrode, and a fluxing compound disposed within said groove.

11. An arc welding electrode comprising, in combination, a flat-wound metallic spiral member, an edge-wound metallic spiral member formed with said flat-wound member, and a fluxing compound covering said flat-wound member and leaving bare the outer periphery of said edge-wound member.

12. An arc welding electrode comprising, in combination, an L-shaped metallic member wound in the form of a spiral in such manner as to provide a spiral groove in the periphery of the electrode, and a fluxing compound disposed in said groove.

13. An arc welding electrode comprising, in combination, a channel-shaped metallic member wound in the form of a spiral in such manner as to provide a spiral groove in the periphery of the electrode, and a fluxing compound disposed in said groove.

ALBERT M. CANDY.